United States Patent [19]

Hsu

[11] Patent Number: 5,287,491
[45] Date of Patent: Feb. 15, 1994

[54] NETWORK REARRANGEMENT METHOD AND SYSTEM

[75] Inventor: Yarsun Hsu, Pleasantville, N.Y.

[73] Assignee: International Business Machines Corporation, Armonk, N.Y.

[21] Appl. No.: 335,916

[22] Filed: Apr. 10, 1989

[51] Int. Cl.$^5$ ............... G06F 11/20; G06F 13/36
[52] U.S. Cl. ............... 395/575; 340/827; 364/DIG. 1; 364/268.7; 371/11.2
[58] Field of Search ............ 364/229.4, 231, 239, 364/268, 267; 371/11.2, 11.3; 340/827; 370/60; 395/575

[56] References Cited

U.S. PATENT DOCUMENTS

| | | | |
|---|---|---|---|
| 5,018,129 | 5/1991 | Netravali et al. | 370/1 |
| 5,072,440 | 12/1991 | Isono et al. | 370/60 |

OTHER PUBLICATIONS

Yang, S. et al., "Graceful Degradation of Fault-Tolerant Multistage Interconnection Networks", *Proceedings of the 1987 International Conf. on Parallel Processing*, pp. 121-123.
D. Lawrie, "Access and Alignment of Data in an Array Processor", *IEEE Trans. on Computers*, vol. C-24, No. 12, Dec. 1975, pp. 1145-1155.
K. Padmanabhan et al., "A Class of Redundant Path Multistage Interconnection Network", *IEEE Trans. on Computers*, vol. C-32, No. 12, Dec. 1983, pp. 1099-1108.
Wu C., et al., "The Reverse-Exchange Interconnection Network", *IEEE Trans. on Computers*, vol. C-29, No. 9, Sept. 1980, pp. 801-811.
Moore, M., et al., "Bi-directional Networks for Large Parallel Processors", *Computer Architecture News*, vol. 15, No. 3, Jun. 1987, pp. 3-5.
Castan, M., et al., "MaRS:A parallel graph reduction multiprocessor", *Computer Architecture News*, vol. 16, No. 3, Jun. 1988, pp. 17-24.
Contessa, A., "An approach to fault tolerance and error recovery in a parallel graph reduction machine:MaRS-a case study", *Computer Architecture News*, vol. 16, No. 3, Jun. 1988, pp. 25-32.
H. J. Siegel, W. T. -Y. Hsu, M. Jeng, "An Introduction to the Multistage Cube family of Interconnection Networks," *Journal of Supercomputing*, 1, 13-42(1987).
C. -L. Wu and T. -Y. Feng, "On A Class of Multistage Interconnection Networks," *IEEE Transactions on computers*, vol. C-29, No. 8, pp. 694-702, Aug. 1980.

*Primary Examiner*—Stephen M. Baker
*Attorney, Agent, or Firm*—Ratner & Prestia

[57] ABSTRACT

A system and method for a fault-tolerant system for parallel networks which interconnect processors and the first of the parallel networks distributed in an Omega configuration and the second of the parallel networks distributed in a reversed Omega configuration.

2 Claims, 9 Drawing Sheets

NETWORK REARRANGEMENT METHOD AND SYSTEM

BACKGROUND OF THE INVENTION

Parallel processing is a widely used method for supplying a great amount of computational power with the benefits of both reduced costs and higher efficiency. Tasks which take advantage of the real-time response and/or the processing of immense data sets of parallel processing include: weather forecasting, map-making, aerodynamics simulations, chemical reaction simulations, image enhancement and analysis, air traffic control, robotic vision and speech recognition. In all of these systems, a multiplicity of processors are interconnected, each performing various functions simultaneously. In order to operate such a system, there is a need to network the multiplicity of processors with other devices such as memory modules, as an example.

In such an interconnection scheme, it is necessary to provide fast and flexible communications between the connected nodes (connections). The more nodes attached to the network, the greater the difficulty in providing interconnection between all of the nodes. As the number of nodes in a network increase, it becomes prohibitive for direct connection from one node to the other. In the case of parallel processing, to provide direct connections between each of the processors with each of the memory modules is unrealistic from both economic and design choice perspectives.

Another desirable aspect of a network scheme is to be fault tolerant. This requires that if any link in the network goes down, there is a backup network or a parallel network operating to ensure that network traffic and communications continue.

Many networks, such as the omega, baseline, delta (A=B=2), generalized cube, indirect binary N-cube, shuffle exchange and SW-Banyan (S=F=2) are used in parallel processing network systems. All of these networks are topologically equivalent, as stated by Sigel, H. J., Hsu, W. T. and Jeng, M. in "An Introduction to the Multistage Cube Family of Interconnection Networks," Journal of Supercomputing, Vol. 1, No. 1, 1987, which is incorporated by reference herein.

Networks use switching boxes to effectuate access by all processors of all devices connected to the network. Switching boxes of appropriate design and programming for a given network design are known and understood by network designers.

SUMMARY OF THE INVENTION

The present invention involves a fault-tolerant network system having parallel networks for interconnecting processors and/or peripheral devices such as memory modules. One of the parallel networks is distributed in an Omega equivalent configuration while the other network is distributed in a reversed Omega equivalent configuration. This network system improves load and traffic flow rate of the system which is a desirable feature of network systems.

The method and system applies to any parallel network configuration where the networks can be configured as an Omega equivalent network. Thus, a network can either be converted to an Omega that works or arranged in an Omega equivalent configuration. This is true for the reversed Omega configuration of one of the parallel networks of the present invention.

BRIEF DESCRIPTION OF THE DRAWINGS

FIG. 4 shows the parallel network system 30 with a breakdown in switching box 66 of network 30a.

FIG. 5 shows a parallel network system 30 with a breakdown in switching box 76 of network 30a.

FIG. 6 shows a parallel network system 30 with a breakdown in switching box 82 of network 30a.

FIG. 7 shows an embodiment of the present invention showing a system 31 having parallel network 31b arranged in a reversed Omega configuration. There is a breakdown in switching box 66 of network 31a.

FIG. 8 is an embodiment of the present invention using a reverse Omega configuration in parallel network 31b. There is a breakdown in switching box 76 of network 31a.

FIG. 9 shows an embodiment of the present invention with parallel network 31b arranged in a reverse Omega configuration. There is a breakdown in switching box 82 of network 31a.

DETAILED DESCRIPTION

Figure 1:
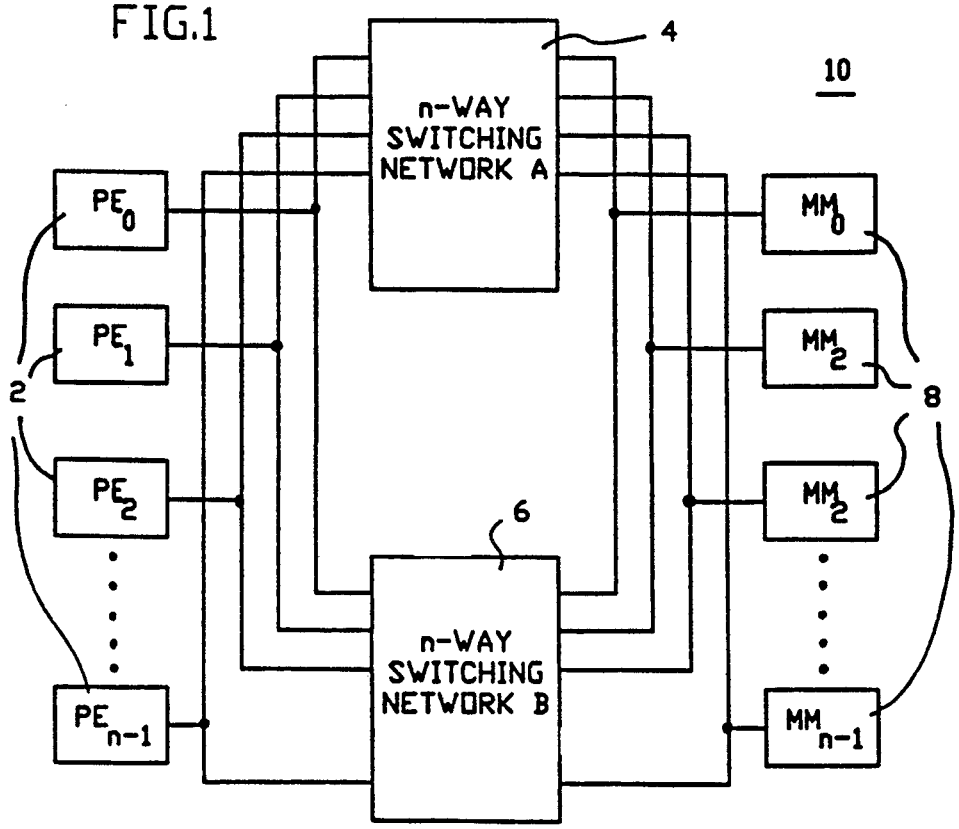
FIG. 1 is a shared memory pack, parallel, fault-tolerant system.

There is shown in FIG. 1 a system 10, which is a shared memory, parallel, fault tolerant system. System 10 is comprised of two switching networks 4 and 6 operating in parallel, which serve as an interconnection switching network between a plurality of processors 2 and memory modules 8. In this system, any of the processors are able to access any of the memory modules independent of access from any other processor. For example, in one embodiment of this network system, one of the two networks would be designated for handling combinable messages and the other for non-combinable messages. Either network, however, is capable of handling both types of messages so that in the event of a breakdown or failure in one network, the other network is able to handle the traffic of both networks. This is essentially the operation of one type of parallel design, fault tolerant network, as known in this field of art. It is not a requirement of the invention for the networks to be related in this manner. The system and method are designed for parallel networks having $\log_2 N$ number of stages, where N is the number of inputs to be shuffled.

Figure 2:
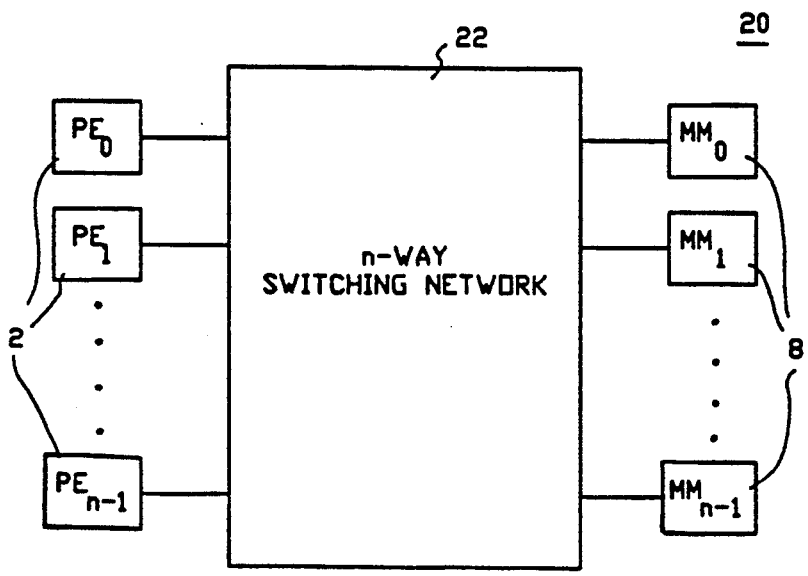
FIG. 2 is a single switching network.

FIG. 2 is an illustration of a system 20 in which there is only one network and thus no fault tolerant operation. Should a breakdown or failure occur in switching network 22, system 20 would fail to operate as data flow between the processors and memory modules would not be maintained. A breakdown could be of any form (i.e., defective switching box(es), broken/bad connection(s), etc.).

Figure 3:
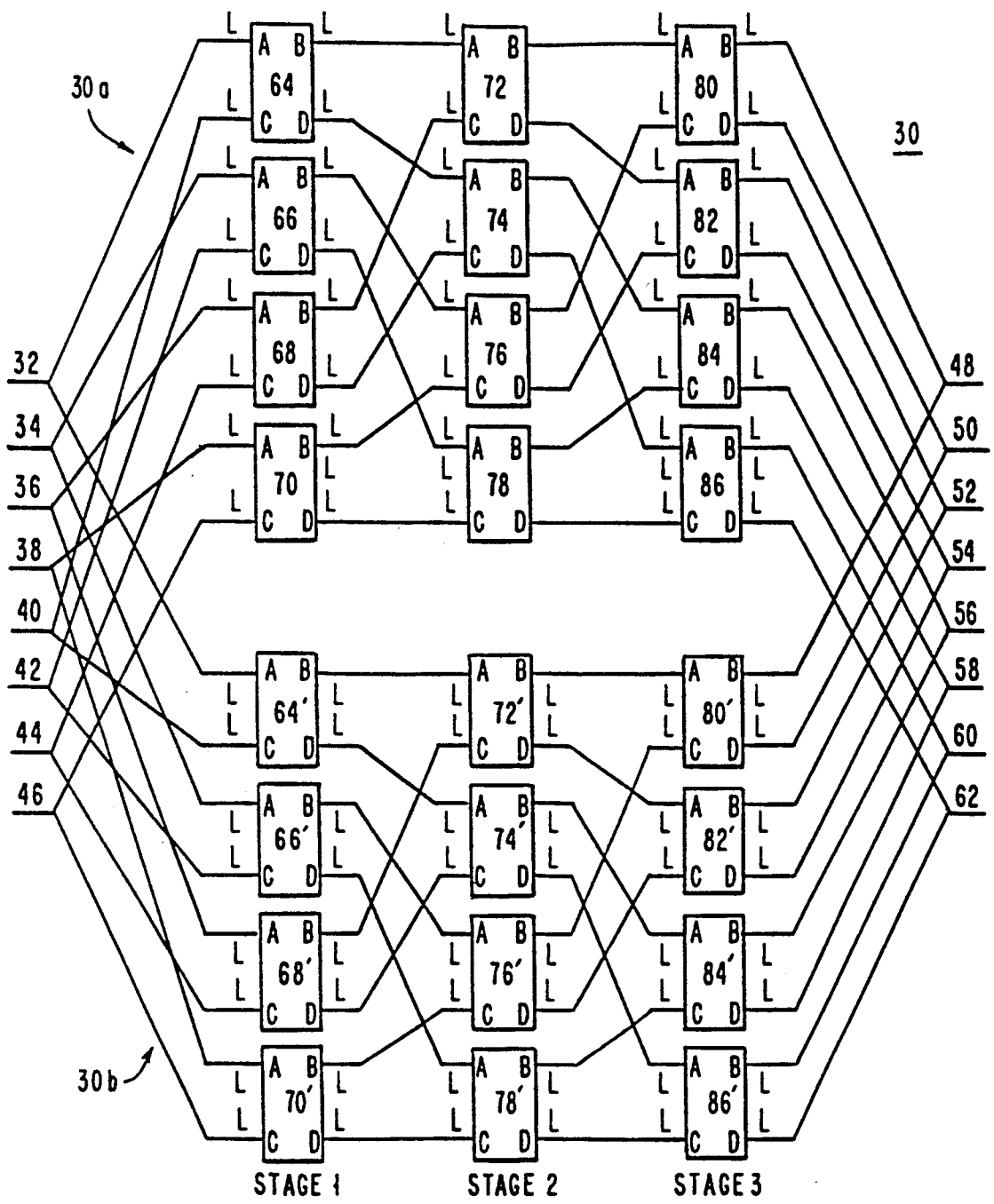
FIG. 3 shows a parallel network system consisting of three stages in each of the parallel networks, and 8 processors and 8 memory modules connected through each of the parallel networks.

FIG. 3 shows a system 30 comprising networks 30a,b. System 30 is a specific example of how system 10 would be set up in the form of an 8 processor, 8 memory module omega network in which the network paths (or links) are distributed in perfect shuffle configuration.

Note, that the 3 stage, 8 processor, 8 memory module system 30 is an example configuration. The system and method of the present invention will work for any $\log_2 N$ stage network.

In an omega network, switching boxes 64 through 70 and corresponding switching boxes 64' through 70' comprise stage 1; switching boxes 72 through 78 and corresponding switching boxes 72' through 78' comprise stage 2; and switching boxes 80 through 86 and corresponding switching boxes 80' through 86' comprise stage 3. Each switching box consists of two inputs and two outputs. In the calculation of load distribution, it is assumed that a message received by either input can be routed to either output with equal probability.

In system 30, processors 32 through 46 are connected via a first omega network 30a to memory modules 48 through 62. In network 30b of FIG. 3 a second omega network is coupled in parallel to network 30a to ensure fault tolerance. Switching boxes 64 through 86 and 64' through 86' ensure that each processor has access to each memory module. The reference character L stands for load which equals the amount of traffic per unit time into or out of each switching box through the respective data lines and input ports (A and C) and output ports (B and D). It can be seen that in both networks 30a and b, the loads are evenly distributed as there has been no failure or breakdown condition. For purposes of this example, it is assumed that processor requests are uniformly distributed over all memory modules.

Figure 4:
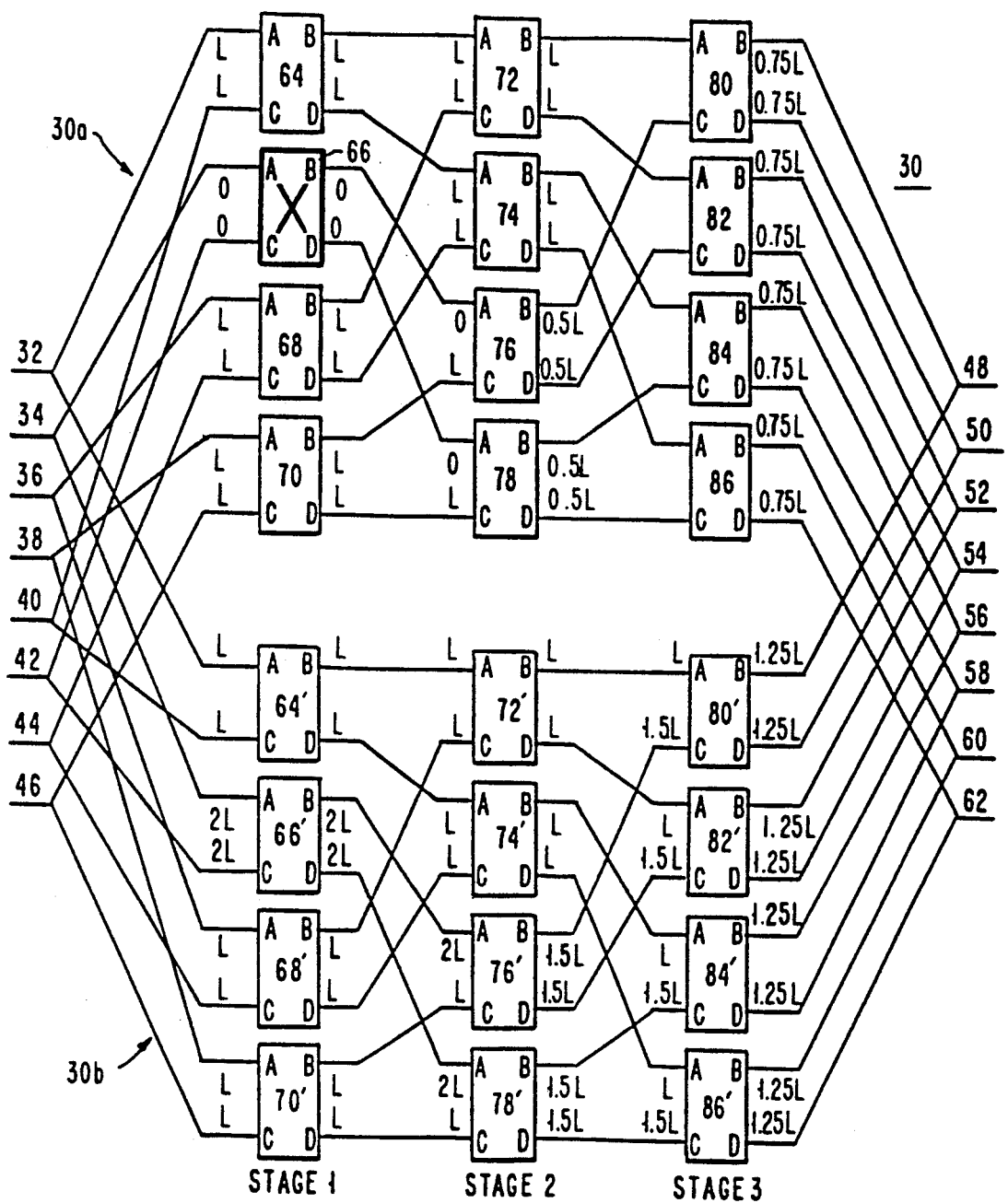

FIG. 4, however, illustrates the operation of parallel network 30a,b where a breakdown has occurred. In network 30a of FIG. 4, the "x" in switching box 66 indicates that it has failed. In this case, no data is transmitted through switching box 66, leaving processors 34 and 42 unable to communicate with any of memory modules 48 through 62. Since the system is running in parallel with the identical omega network 30b in FIG. 4, the traffic through switching box 66 is redirected through switching box 66', essentially doubling the load that is now being transmitted through switching box 66'. This is illustrated by the 2 L entering the two input ports (A and C) to switching box 66', as well as the two output ports (B and D) exiting switching box 66'. Thus, the network 30b no longer has an even distribution of traffic flow.

It is thus seen in network 30b, FIG. 4, that the distribution of traffic, as illustrated by the load figures, is not uniform. In stage 1, network 30b, the traffic out of switching box 66' is 2 L out of both output ports. All other switching boxes in stage 1 have output loads of 1 L. In stage 2, switching boxes 76' and 78' have output loads of 1.5 L through each output port, which is a factor of one-half greater than the output from switching boxes 72' and 74'. The output load of stage 3 in network 30b is uniform. This non-uniform load is less desirable as it is preferred to have a network with as uniform a load through each stage as possible. This reduces the traffic through any one or more switching boxes and ensures speedier and more efficient data transmission.

Figure 5:
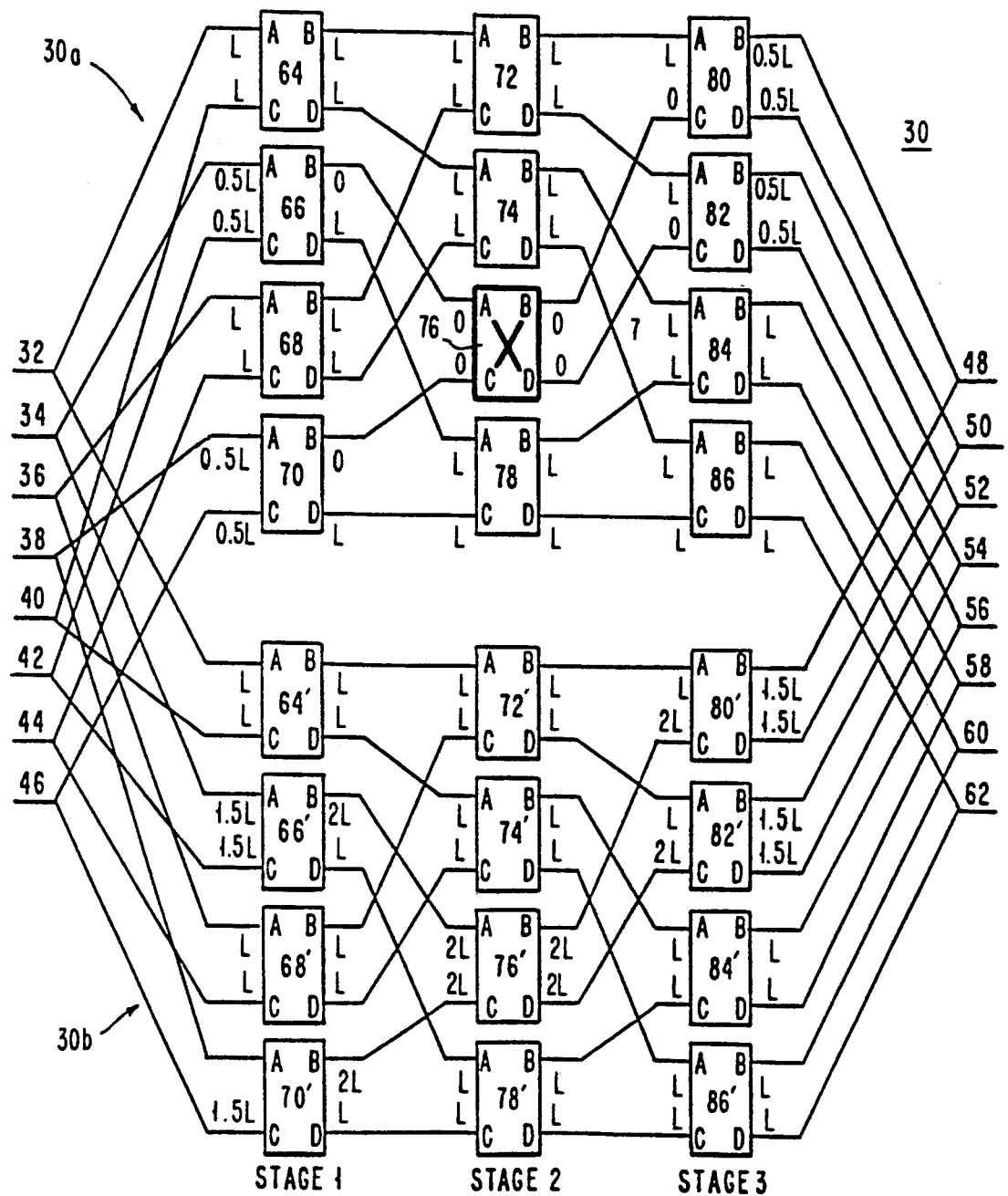

FIG. 5 illustrates operation of system 30 where there is a breakdown in switching box 76 of stage 2 of network 30a. When switching box 76 breaks down, or fails, there is no longer a path or way for data to be transmitted through that switching box, to the associated processors or memory modules. This also presents a reduction in the traffic load through switching boxes 66 and 70 in stage 1 of network 30a. The inputs to switching boxes 66 and 70 are reduced by a factor of 1.0 L since output B of switching box 66 is effectively inoperative.

The total load difference between the networks 30a,b is 2.0 L. As the load in network 30a of FIG. 5 has now been reduced at switching box 66 to a total of 1.0 L (0.5 L + 0.5 L), there must be a corresponding increase in traffic load through network 30b. This is represented at the input lines shown inputting to switching box 66'. Here, the inputs are now 1.5 L into each input port, A and C respectively. This is an increase of a total load factor of 1.0 L (0.5 L at each input port), which equals the decrease in load through network 30a. The same is true for switching boxes 70 and 70'.

Network 30b, with its increased load because of the failure in switching box 76 of network 30a, shown in FIG. 5, now has an increased load and no longer has a uniform distribution of its communication traffic. This is seen by the non-uniformity of outputs at each of the three stages in network 30b, particularly at the outputs of stage 3 which show loads of 1.5 and 1.5 out of both switching boxes 80' and 82' and an output load of L and L from switching boxes 84' and 86'.

Figure 6:
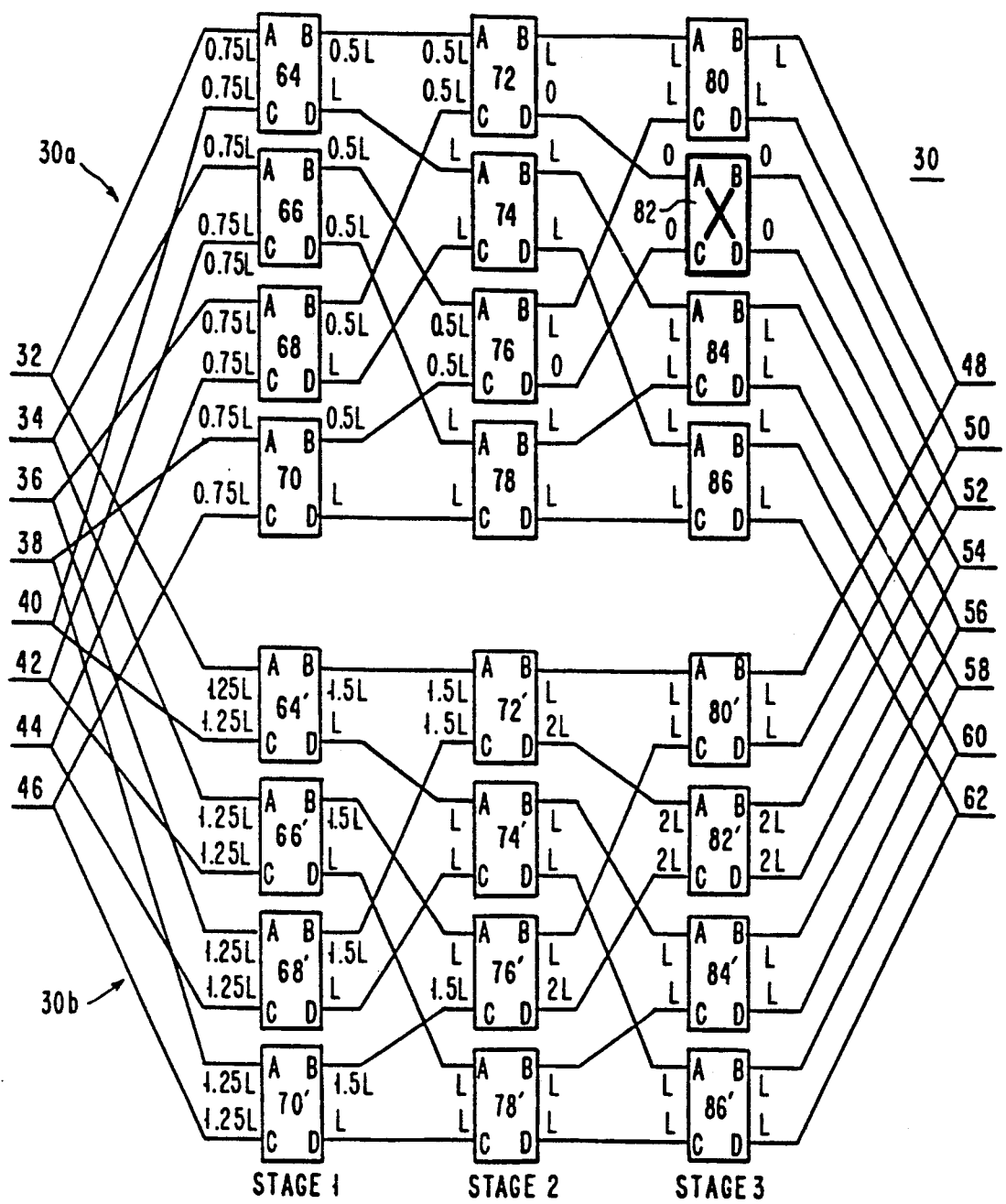

Turning now to FIG. 6, system 30 now presents a breakdown or failure in switching box 82 of stage 3 of the network 30a. As in the previous two switching box failures, traffic must again be rerouted through network 30b, to ensure that communication between all processors and memory modules is maintained. Traffic flow is no longer uniform, with a disproportionate amount of traffic load shown in box 82' of network 30b.

Figure 7:
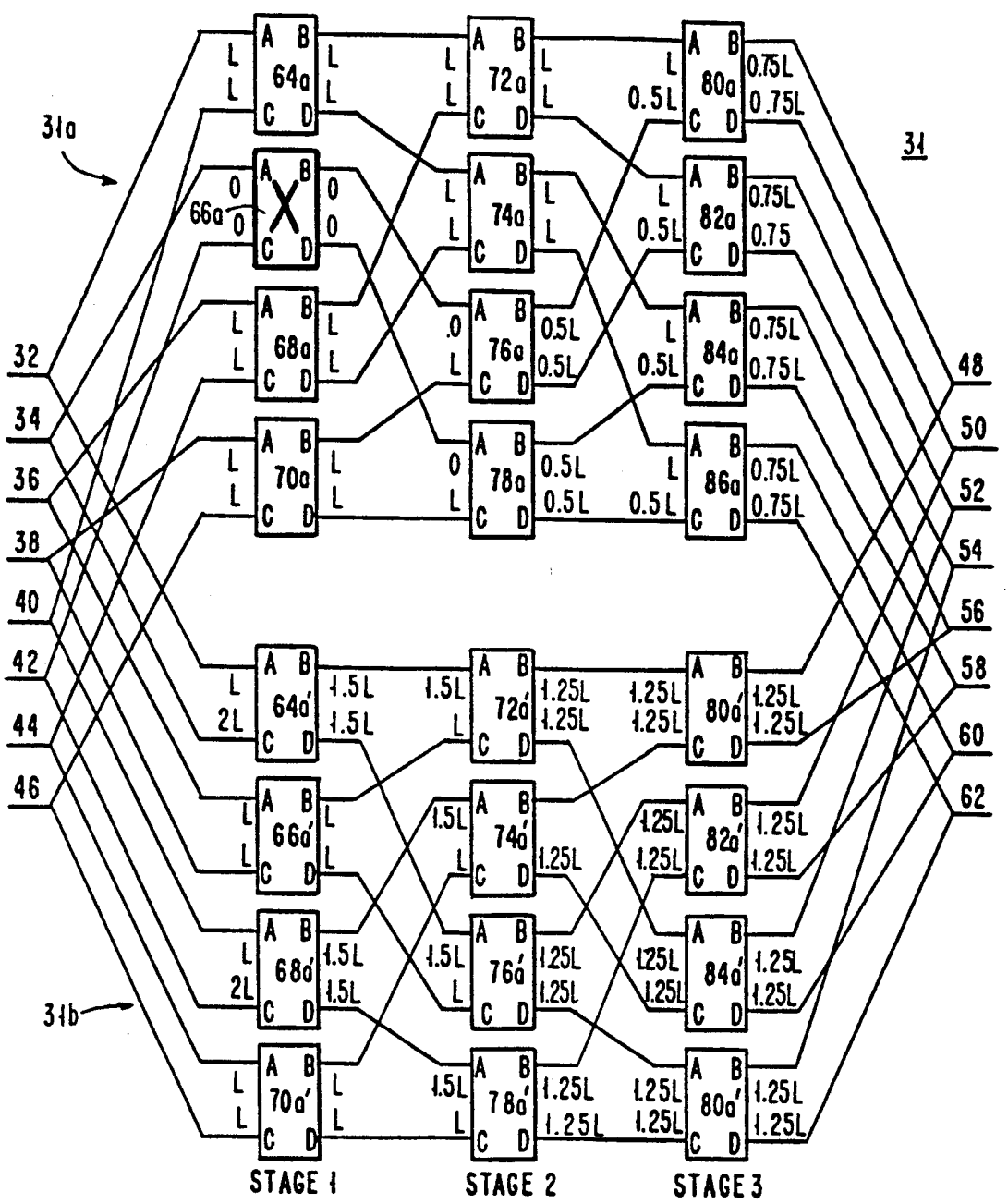

In accordance with the present invention, in FIG. 7, system 31 distributes traffic at any given switching box and establishes a more uniform traffic flow pattern throughout the network. System 31 operates in a parallel for providing fault tolerance, should a breakdown or failure in any switching box and/or link occur. The difference, however, between systems 30 and 31 is that in FIG. 7, network 31b is not identical to network 31a. Network 31b is defined as a reverse (or reversed) omega network. This new design distributes the increased traffic load, which arises when there is a breakdown in a switching box in the first network, over several switching boxes in the second network. In doing so, traffic flow is distributed more uniformly over the entire second network and thus improves both efficiency and accuracy in data transmission for the entire system.

System 31 shown in FIG. 7 can be compared to system 30a shown in FIG. 4. In network 31a, FIG. 7, there is a failure in switching box 66 of stage 1, similar to that shown in network 30a, FIG. 4. However, the increased traffic load that now must be directed to the second network shown in network 31b of FIG. 7 is less non-uniform through stages 1 and 2 as was the case in network 30b of FIG. 4. The reverse omega network 31b of FIG. 7 accepts its increased traffic load into switching boxes 64' and 68', so that by the second stage traffic flow has already become more uniformly distributed over all four switching boxes 72'-78' of the second stage. By the third stage of network 31b, all input traffic flow, as well as output traffic flow, is both uniform and identical.

This is not the case when two identical omega networks were used in parallel, as shown in FIG. 4. As was previously described, the traffic flow in network 30b of FIG. 4 was not uniform throughout its stages and only approached uniformity by the third stage. Again, a goal of network design and architecture is to provide as uniform traffic flow as possible to ensure accurate and efficient data transmission and communication.

Figure 8:
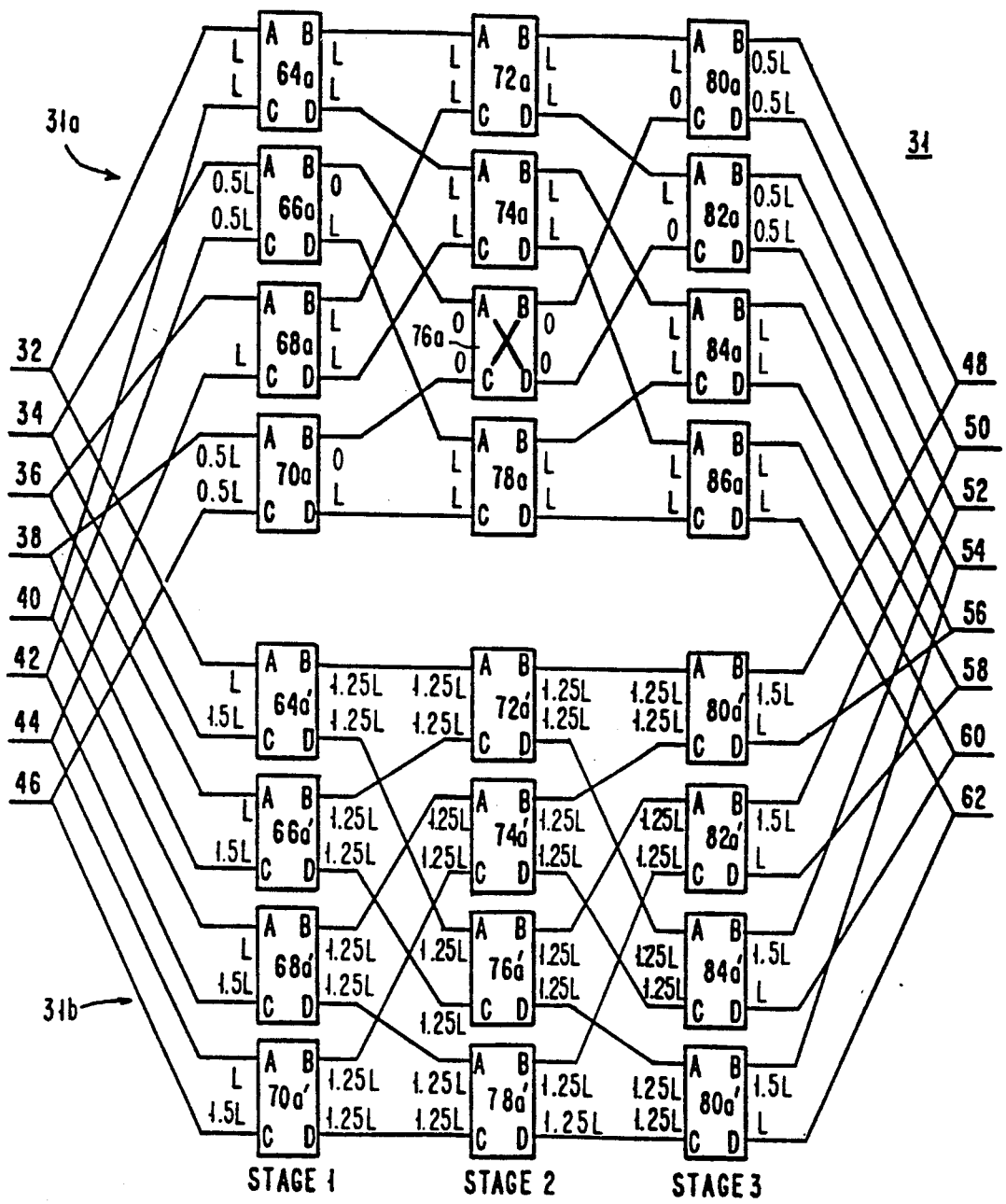

System 30, as described in FIG. 8, contains the same failure in switching box 76 of stage 2, as did system 30 shown in FIG. 5. Again, by using a reverse omega design in network 31b of FIG. 8, the traffic non-uniformity problem illustrated in network 30b of FIG. 5, is nearly eliminated. When a second stage switching box failure occurs, there is an even more disruptive distribution of traffic load than in a first stage switching box failure. This is illustrated in FIG. 5.

By using the reverse omega in network 31b of FIG. 8, traffic load is uniform from the outputs of the first stage through to the inputs of the third stage. The outputs of the third stage are substantially more uniform than those shown in network 30b of FIG. 5.

It must be remembered that the total load in inputs and outputs of the networks comprising system 30 must be uniform. This means that there are a total of 8 L input and also 8 L output load factors. Thus, when there is a switching box failure in a network and traffic must be rerouted through the second network, the total load of the system is not affected. Looking to FIG. 8, it can be seen that the failure in switching box 76 of network 31a, results in a reduction in load factor by 1 at switching box 66 and also by 1 at switching box 70. This reduction in load necessitates an increase in load in switching boxes 64', 66', 68' and 70' in network 31b. The total input and output load for the system, however, is still the same, whether or not there is a rerouting of traffic. The same is true for the outputs of the networks. The total output of each network is 8 L if there are no failures in any of the switching blocks.

Upon failure, the total output is equivalent to an output of 8 L per network, but is now distributed differently. This is seen by the reduction in network 31a of FIG. 8 of 1 L out of switching box 80 and 1 L out of switching box 82. This total decrease of 2 L is then distributed over the outputs of the network shown in network 31b of FIG. 8. This distribution is more uniform as there is a 5 L increase out of switching boxes 80' through 86', instead of merely both output ports B and D of boxes 80' and 82' of FIG. 5.

Figure 9:
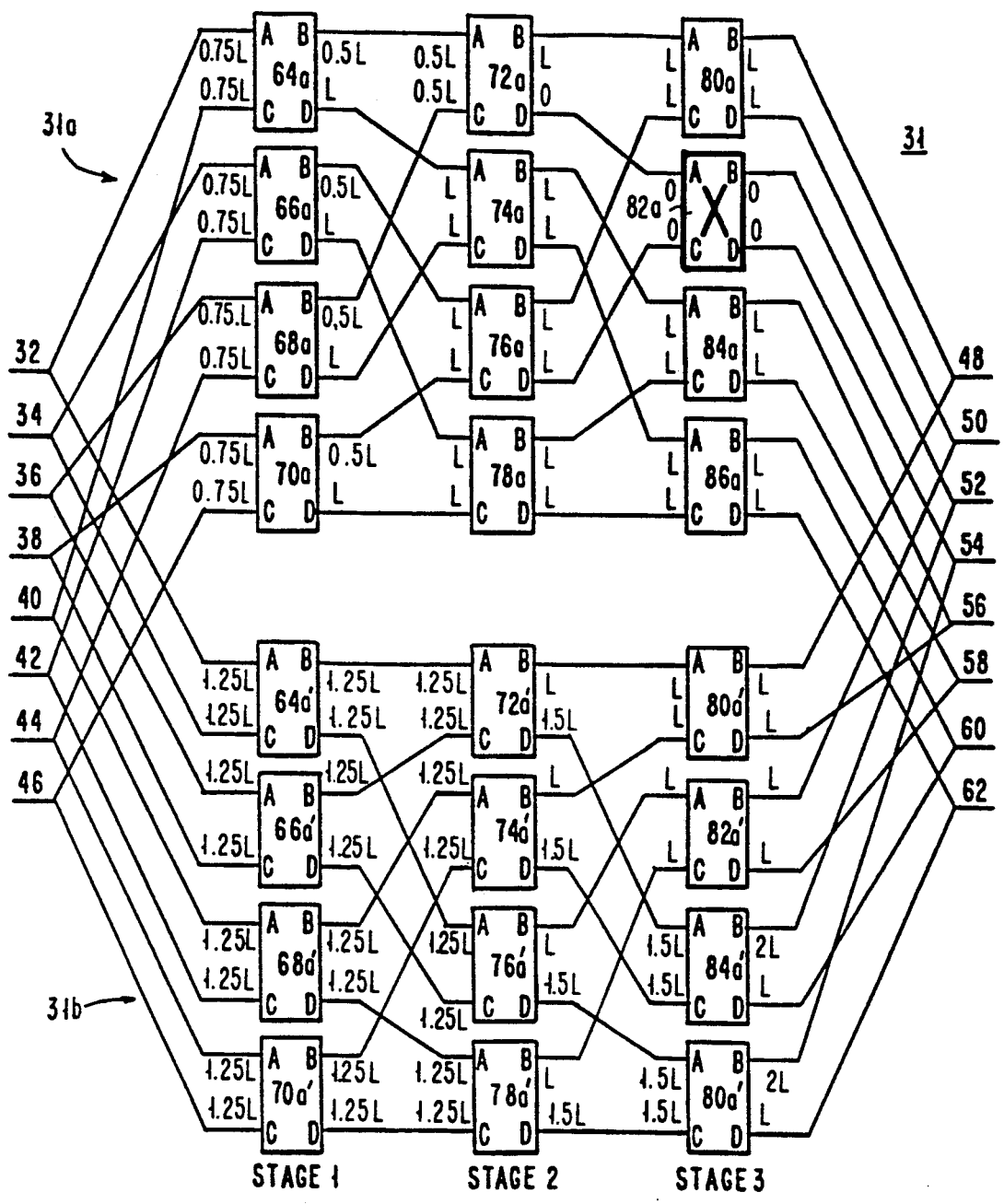

System 31 as shown in FIG. 9 shows a failure in switching box 82 of stage 3, similar to the situation of system 30 shown in FIG. 6. Network 31b of FIG. 9, however, uses the reverse omega network configuration to reduce traffic flow for this failure situation also. In network 31a of FIG. 9, it can be seen that the failure of switching box 82 prevents communications to and from memory modules 52 and 54. Traffic which requires transmission through switching box 82 is rerouted into the reverse omega network shown in network 31b.

The distribution of traffic flow in FIG. 9B is readily seen as more uniform than the distribution of traffic shown in FIG. 6B where an omega network, identical to that of FIG. 6A is used. Though not completely uniform (as not all loads into and out of every switching box are identical), it is a more desirable operational design.

Whereas in FIG. 6, network 30a, the output load from switching box 82' is 2 L out of output ports B and D, in FIG. 9, network 31b, the double load (2 L) is distributed over two switching boxes 84' and 86' and out of only one output port from each switching box. Further, the distribution of load throughout the network, as seen in stage 2 for example, is also more uniformly distributed. All inputs into second stage switching boxes are 1.25 L and all outputs are a repetitive pattern from switching box 72' to 74' to 76' to 78' of L 1.5 L, L 1.5 L, etc.

This distribution, though not completely uniform, is still a more uniform distribution than can be obtained by merely using the dual identical network operation as is commonly done in present network systems. In cases of switching box failure, it is not possible to get true uniform distribution because of the increased traffic load that must be passed on to the second network running in parallel. Achieving a greater degree of uniformity or traffic load distribution will nonetheless enhance efficiency and communication accuracy. This is accomplished by using the reverse omega design of the present invention.

The examples illustrated in the figures show a parallel network architecture using omega networks and the reversed omega network design of this invention. The use of the omega network architecture was to illustrate both the problem that arises when there is a switching box failure and the improvements to a parallel network architecture achieved by the present invention. The networks illustrated were all eight processor-eight memory module networks. This was solely for the purposes of illustration, as the networks can easily run with a plurality of processors and memory modules or other devices connected to the network.

Other networks, such as the baseline, delta (a=b=2), generalized cube, indirect binary n-cube, flip, shuffle-exchange, and SW-banyan (S=F=2) are topologically equivalent with the omega network. See Siegel, H. J. et al., "An Introduction to the Multistage Cube Family of Interconnection Networks," supra at pp. 13-14. Network rearrangement schemes between these networks are well known to those skilled in the art. Thus, to operate another network in an arrangement equivalent to the reverse omega network described above is possible. This would achieve the same results of this invention in other network design schemes.

Networks could either be replaced with the omega/-reverse omega design or one of the networks could be redesigned as a reverse omega configuration of the other network being used. This would provide operation of a parallel network scheme using a network other than the omega, yet providing the distributional effect of the reverse omega design of the present invention.

Figure 10:
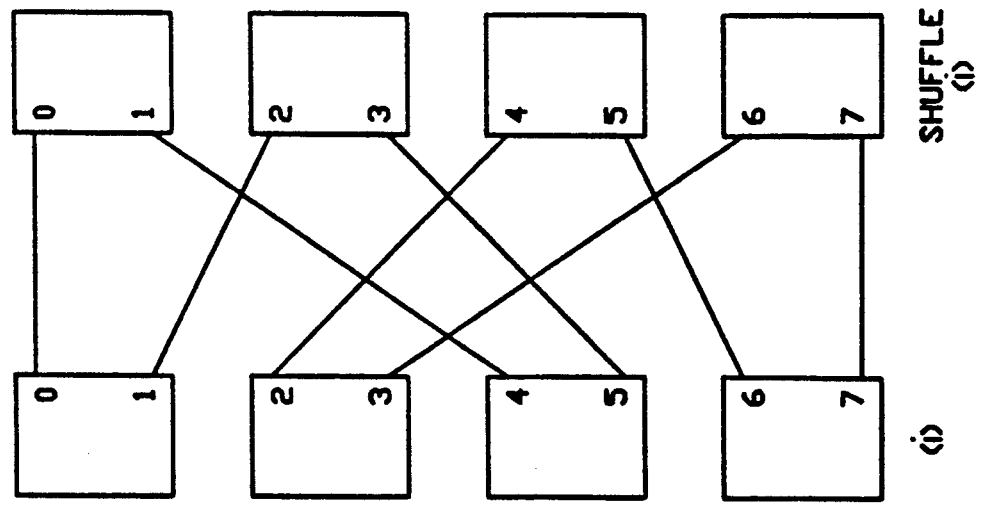
FIG. 10 shows a perfect shuffle distribution for an example network having 8 inputs and 8 outputs.

To achieve the reverse omega design, it is necessary to reverse the perfect shuffle distribution path of the omega design. The distribution of the network connections in the omega network can be described as:

$$\text{Shuffle }(i) = 2i \text{ if } 0 \leq i \leq \left(\frac{N}{2}\right) - 1$$
$$= 2i + 1 - N \text{ if } \left(\frac{N}{2}\right) \leq i \leq N - 1$$

where N is the number of inputs to be shuffled. FIG. 10 shows the result of the perfect shuffle for an example network using N inputs. This is consistent with the omega networks in FIGS. 3 through 9. Graphically, the first half of inputs (for N=8 one-half N=4) are connected to the uppermost input ports (port A in FIGS. 3 through 9) of the switching boxes. The lower half of the inputs are connected to the lower input ports (C as shown in FIGS. 3 through 9). This constitutes the perfect shuffle of the omega network. To implement a reverse omega network of this invention, it is necessary to reverse the perfect shuffle. This is described as:

$$\text{Reverse Shuffle}(j) = \left(\frac{j}{2}\right) \text{ if } j \text{ is even}$$
$$= \left(\frac{j-1}{2}\right) + \left(\frac{N}{2}\right) \text{ if } j \text{ is odd}$$

Figure 11:
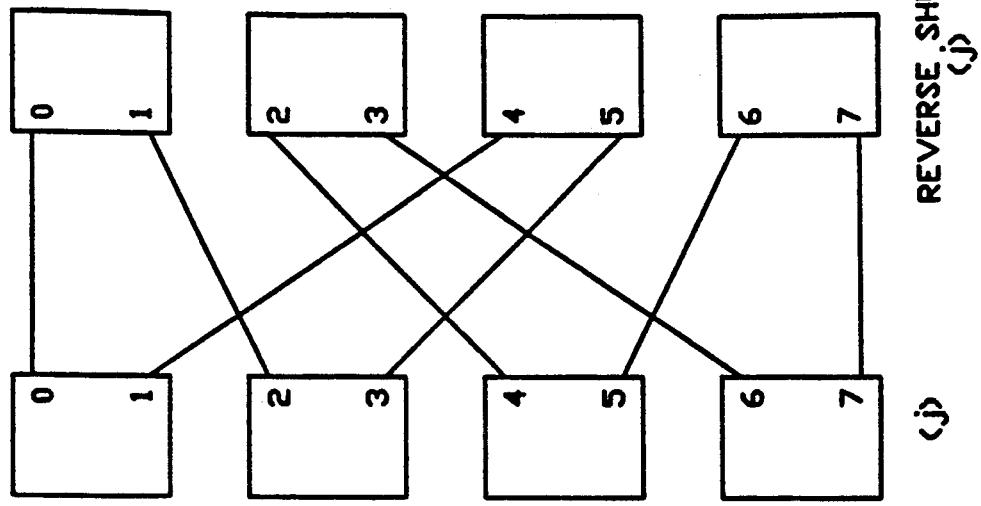
FIG. 11 shows an example of a reverse Omega configuration of a network having 8 inputs and 8 outputs.

Again, for an example of N=8, the reverse shuffle can be graphically seen in FIG. 11. Here, the perfect shuffle is going in the opposite direction, as described by the above formulas.

Designing the reverse omega network serves to distribute the increased load over more switching boxes than is accomplished by running an identical omega network in parallel.

What is claimed is:

1. A fault tolerant system for increasing traffic uniformity of a network system comprising a plurality of interconnected processors having first and second multistage networks coupling said processors to a plurality of nodes, wherein one of said first and second networks serves as a backup network for the other network said first and second multistage networks connected in parallel to transfer data in the same direction as the other between said processors and said nodes, said first multistage network distributed in an omega configuration and said second network distributed in a reverse omega configuration.

2. A method for providing a fault tolerant system for increasing traffic uniformity of a network system comprising a plurality of interconnected processors and a plurality of nodes comprising the steps of:
   a) arranging a first multistage network into an omega configuration;
   b) arranging a second multistage network into a reverse omega configuration and wherein one of said first and second multistage networks serves as a backup network for the other network; and
   c) connecting the omega equivalent configuration and the reverse omega equivalent configuration in parallel to transfer data in the same direction as the other between said processors and said nodes.

* * * * *